US010764536B2

(12) United States Patent
Zhang et al.

(10) Patent No.: US 10,764,536 B2
(45) Date of Patent: Sep. 1, 2020

(54) SYSTEM AND METHOD FOR A DYNAMIC HUMAN MACHINE INTERFACE FOR VIDEO CONFERENCING IN A VEHICLE

(71) Applicant: DENSO International America, Inc., Southfield, MI (US)

(72) Inventors: Yu Zhang, Farmington Hills, MI (US); Bilal Alasry, Dearborn, MI (US); Te-Ping Kang, Ann Arbor, MI (US); Vikas Upmanue, Novi, MI (US); Jordan Necovski, Livonia, MI (US); Sean Bleicher, Fenton, MI (US); Doua Vang, Waterford, MI (US); Eleanor Duke, Sterling Heights, MI (US); Nicholaus Spunar, Canton, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/233,253

(22) Filed: Dec. 27, 2018

(65) Prior Publication Data

US 2020/0213560 A1   Jul. 2, 2020

(51) Int. Cl.
*H04N 7/15* (2006.01)
*B60K 35/00* (2006.01)
*G06K 9/00* (2006.01)

(52) U.S. Cl.
CPC ............ *H04N 7/152* (2013.01); *B60K 35/00* (2013.01); *G06K 9/00838* (2013.01); *G06K 9/00845* (2013.01); *B60K 2370/186* (2019.05); *B60K 2370/334* (2019.05)

(58) Field of Classification Search
USPC ...................................... 348/14.09
See application file for complete search history.

(56) References Cited

U.S. PATENT DOCUMENTS

| | | | |
|---|---|---|---|
| 2002/0121969 A1 | 9/2002 | Joao | |
| 2007/0178944 A1* | 8/2007 | Mitsuru | H04N 7/148 455/569.1 |
| 2008/0318598 A1* | 12/2008 | Fry | B60R 25/24 455/456.5 |
| 2013/0342637 A1* | 12/2013 | Felkai | H04L 69/24 348/14.08 |
| 2014/0002357 A1* | 1/2014 | Pombo | G06F 3/012 345/158 |

* cited by examiner

Primary Examiner — Amal S Zenati
(74) Attorney, Agent, or Firm — Brooks Kushman P.C.

(57) ABSTRACT

A system in a vehicle comprising one or more sensors configured to obtain cognitive-load data indicating a cognitive load of an occupant of the vehicle, a controller in communication with the one or more sensors, wherein the controller is configured to determine a cognitive load of the occupant utilizing at least the cognitive-load data in response to an initiation of a video conference session, and output on a vehicle display a first user interface in connection with the video conference session when the cognitive load exceeds a threshold and a second user interface in connection with the video conference session when the cognitive load is below a threshold, wherein the second user interface includes video of the video conference session and the first user interface excludes video of the video conference session.

14 Claims, 4 Drawing Sheets

SYSTEM AND METHOD FOR A DYNAMIC HUMAN MACHINE INTERFACE FOR VIDEO CONFERENCING IN A VEHICLE

TECHNICAL FIELD

The present disclosure relates to video conferencing in a vehicle.

BACKGROUND

Mobile phones may allow for video conferencing between two or more people. The video conferencing feature of a mobile phone may be utilized both inside and outside of a vehicle. During certain driving scenarios, the video conferencing system may be consuming on the cognitive load of an occupant in a vehicle.

SUMMARY

According to one embodiment, a system in a vehicle is disclosed that includes one or more sensors configured to obtain cognitive-load data indicating a cognitive load of an occupant of the vehicle, a controller in communication with the one or more sensors, wherein the controller is configured to determine a cognitive load of the occupant utilizing at least the cognitive-load data in response to an initiation of a video conference session, and output on a vehicle display a first user interface in connection with the video conference session when the cognitive load exceeds a threshold and a second user interface in connection with the video conference session when the cognitive load is below a threshold, wherein the second user interface includes video of the video conference session and the first user interface excludes video of the video conference session.

According to one embodiment, a method of outputting a video conferencing system in a vehicle comprises outputting a video conference session on a display of a vehicle, determining a cognitive load of an occupant of the vehicle utilizing cognitive-load data collected by one or more sensors in the vehicle, and displaying a first user interface in connection with the video conference session when the cognitive load exceeds a threshold and displaying a second user interface in connection with the video conference session when the cognitive load is below a threshold, wherein the first user interface includes a first number of user-interface keys than the second user interface includes a second number of user-interface keys, and the first number of user-interface keys is less than the second number of user-interface keys. This scheme could also applied to conference systems have more than two user-interfaces that differed in their cognitive load According to one embodiment, a system in a vehicle includes one or more sensors configured to obtain cognitive-load data indicating a cognitive load of an occupant of the vehicle, a wireless transceiver in communication with a mobile phone, a controller in communication with the one or more sensors and the wireless transceiver, wherein the controller is configured to determine an initiation of a video conference session on the mobile phone, determine a cognitive load of the occupant utilizing at least the cognitive-load data in response to the video conference session initiation, and output on a vehicle display a first user interface in connection with the video conference session when the cognitive load exceeds a threshold and a second user interface in connection with the video conference session when the cognitive load is below the threshold, wherein the first and second user interface are different.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
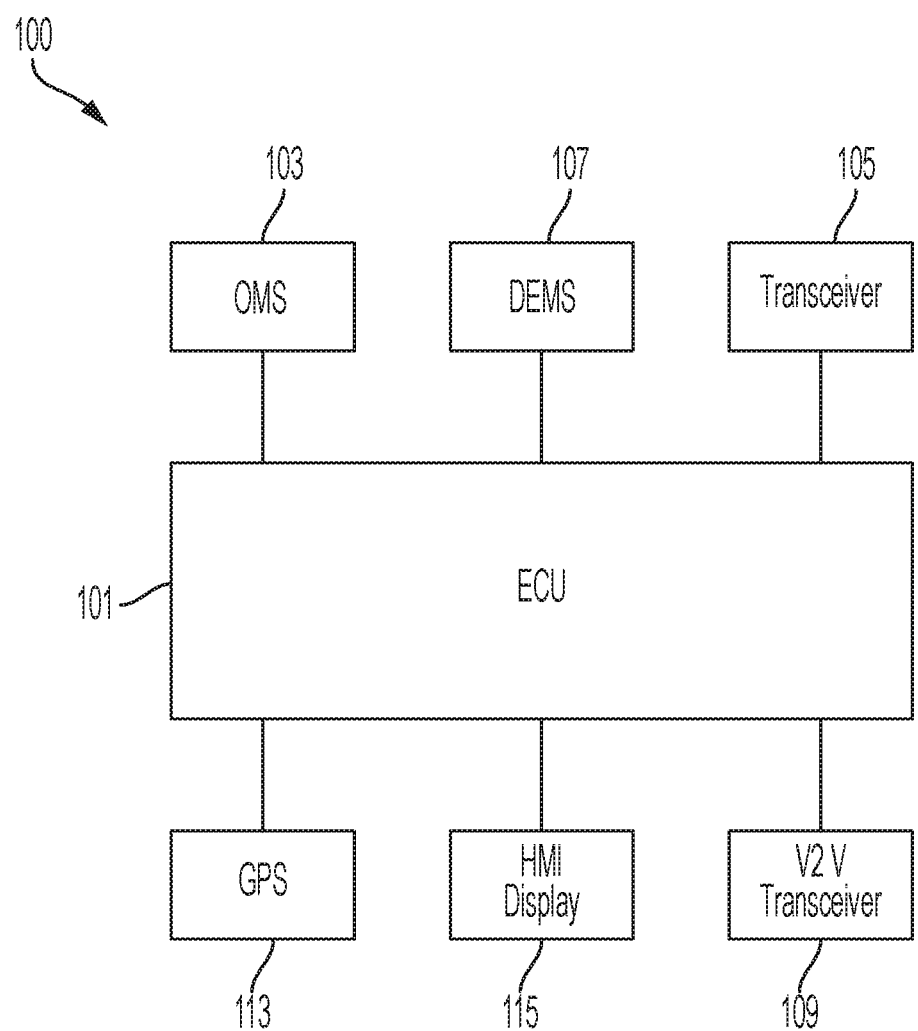
FIG. 1 illustrates an example block diagram of a vehicle system 100. The system 100 may include a controller 101.

FIG. 1 illustrates an example block diagram of a vehicle system 100. The system 100 may include a controller 101. The controller 101 may be a vehicle controller such as an electronic control unit (ECU). The controller 101, also referred to herein as ECU 101, may be embodied in a processor configured to carry out instructions for the methods and systems described herein. The controller 101 may include a memory (not individually shown in FIG. 1), as well as other components specific processing within the vehicle. The controller 101 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The controller 101 may be in communication with various sensors, modules, and vehicle systems both within and remote of a vehicle. The system 100 may include such sensors, such as various cameras, a LIDAR sensor, a radar sensor, an ultrasonic sensor, or other sensor for detecting information about the surroundings of the vehicle, including, for example, other vehicles, lane lines, guard rails, objects in the roadway, buildings, pedestrians, etc. In the example shown in FIG. 1, the system 100 may include an in-cabin monitor system 103, a transceiver 105, a vehicle-to-vehicle transceiver 109, a GPS module 113, a human-machine interface (HMI) display as well as other sensors, controllers, and modules. FIG. 1 is an example system and the system 100 may include more or less sensors, and of varying types. Further, while the vehicle of FIG. 1 is shown with specific sensors in specific locations for purposes of illustration, the system 100 may be equipped with additional sensors at different locations within or on the vehicle, including additional sensors of the same or different type. As described below, such sensors may be utilized to determine a cognitive load of an occupant of the vehicle.

The vehicle system 100 may be equipped with a transceiver 105. The transceiver 105 may be a BLUETOOTH transceiver. In one illustrative embodiment, the system 100 uses the BLUETOOTH transceiver 105 to communicate with a user's mobile device (e.g., cell phone, smart phone, PDA, tablet, or any other device having wireless remote network connectivity). The mobile device can then be used to communicate with a network outside the vehicle system 100 through, for example, communication with a cellular tower. In some embodiments, tower may be a WiFi access point. The mobile device could also be used to track the occupants' phone interaction (e.g. web browsing, texting).

If the user has a data-plan associated with the mobile device, it is possible that the data-plan allows for broad-band transmission and the system could use a much wider bandwidth (speeding up data transfer). In still another embodiment, mobile device is replaced with a cellular communication device (not shown) that is installed to vehicle. In yet another embodiment, the mobile device may be a wireless local area network (LAN) device capable of communication over, for example (and without limitation), an 802.11g network (i.e., WiFi) or a WiMax network. In one embodiment, incoming data can be passed through the mobile device via a data-over-voice or data-plan, through the onboard BLUETOOTH transceiver and into the vehicle's ECU 101. In the case of certain temporary data, for example, the data can be stored on the HDD or other storage media until such time as the data is no longer needed.

In another embodiment, the transceiver 105 may be on on-board communication device or cellular modem. The on-board communication device may not require a cellular phone (e.g. mobile device) to be paired with a BLUETOOTH transceiver to communicate to an off-board server. Instead, the on-board modem may have its own capability to communicate with an off-board network.

An in-cabin monitor system 103 may include a driver status monitoring system (DSM) and an occupant monitoring system (OMS). DSM focused on the primary occupant who making driving maneuver decisions. OMS focused on other occupants who are not involved in driving decisions. Both DSM and OMS may include in-vehicle cameras, which may be utilized to capture images of an occupant in the vehicle. The in-vehicle camera may obtain facial information about an occupant, such as eye-movement of the occupant and head-movement of the occupant, as discussed further below. The in-vehicle camera may be a color camera, infrared camera, or time of flight camera.

A controller may receive driver status data from the DSM to determine an abnormal situation within the vehicle. The DSM employs one or more activity sensors such as a driver-facing camera, a health scanner, and a driver performance evaluator to monitor activities performed by the driver. Based on the activity sensors, the driver status module may determine whether the driver is, for example, distracted, sick, or drowsy as the abnormal situation.

The DSM may be mounted at the meter console to capture the driver's face, especially the driver's eyes. The DSM module or ECU 101 may process data received from the driver-facing camera and monitors whether the driver looks away from the road based on the driver's gaze direction. If the driver looks away, the driver status module or ECU 101 determines the abnormal situation. The driver status module or ECU 101 may also determine whether the driver is drowsy or alert based on how much the driver's eye opens and for how long. In addition, driver status module or ECU 101 may also identify a cognitive load of the user. The driver-facing camera may be utilized for identification of a driver and utilized for possible video conferencing.

A health scanner may be mounted on the steering wheel or suitable location which the driver touches. A health scanner may also use on-contact sensors such as infrared cameras. The health scanner scans physiological features (such as heartbeat, skin conductance level, blood pressure). The DSM module or ECU 101 processes data received from the health scanner and monitors whether the driver is suffering from a severe physical condition or episode, such as a heart attack based on the heartbeat. If the driver is suffering from the serve physical condition or episode, the driver status module determines an abnormal situation.

The health scanner may include multiple sensors utilized to monitor a primary occupant or secondary occupants. The sensors may include primary occupant facing camera that is configured to capture eye movement and a facial expression of the occupant. The sensors may also include a biometric sensor for heart rate, respiration rate, blood pressure, brain activity, skin conductance level, body temperature, etc. via contact-based or non-contact-based sensors. The sensors may include a set of vehicle dynamic sensor, which collect information to assess the quality of driving or the level of maneuver difficulty based on metrics such as speed, acceleration, steering entropy. The other sensors may include whole cabin imaging monitor system to detect and predict the interaction between the primary and other occupants. The sensors may also include audio processing unit to detect and predict the interaction between the primary and other occupants. The multiple sensor include a set of biometric sensor for heart rate, respiration rate, blood pressure, brain activity, skin conductance level, body temperature, etc via contact-based or non-contact based sensor. The system may utilize such information to predict the needs for future interaction between the primary and other occupants.

An OMS may be mounted on the ceiling of the vehicle or suitable location could observe user's interaction with other occupants of the car. The occupant monitor evaluates the actual cognitive demands or potential cognitive demands from interacting with other occupants. For example, if the OMS detecting the user is actively caring for the other occupants (e.g., passing food items, play request media), his/her cognitive load may be evaluated as high. In another example, if the OMS detects an underage child has elevated temperature, it may predict the cognitive demand of the user may increase soon.

A driver performance evaluator may assess driver performance based on the vehicle dynamic data, collected either through embedded data source (such as the CAN bus) or installed data source (such as gyroscope, etc). The driver performance evaluator could be used decide whether a driver is sufficiently focused on the driving task or whether the driver is capable of dealing the current driving environment. The data collected from driver performance data may also be used identify a cognitive load of the user.

The vehicle system 100 may include an external driving environment monitor system (DEMS) 107. The DEMS 107 may include an external camera, which may be mounted in the rear-view mirror. The external camera may also be facing out of the vehicle cabin through a vehicle's windshield to collect imagery data of the environment in front of the vehicle. The external camera may be utilized to collect information and data regarding the front of the vehicle and for monitoring the conditions ahead of the vehicle. The camera may also be used for imaging the conditions ahead of the vehicle and correctly detecting the positions of lane markers as viewed from the position of the camera and the presence/absence, for example, of lighting of the head lights of oncoming vehicles. For example, the external camera may be utilized to generate image data related to vehicle's surrounding the vehicle, lane markings ahead, and other object detection. A vehicle may also be equipped with a rear camera (not shown) for similar circumstances, such as monitoring the vehicle's environment around the rear proximity of the vehicle.

The DEMS 107 could also include other sensors, including the LIDAR sensors, radar sensors, etc. These sensors may be mounted anywhere on the vehicle. For example, it is possible for LIDAR sensors to be mounted on a roof a vehicle with a 360-degree view of the vehicle's surrounding. Furthermore, the various sensors may surround the vehicle to provide a 360-degree view of the vehicle. The vehicle may also be equipped with one or more cameras, one or more LIDAR sensors, one or more radar sensors, one or more ultrasonic sensors, and/or one or more other environmental sensors. Actuators may be utilized to adjust or control an angle of the field of view of the various sensors. Data from these sensors may be processed through DEMS 107 or ECU 101 to identify objects. For example, a forward LIDAR sensor and corner LIDAR sensor may be utilized. The forward LIDAR sensor may be used to determine what vehicle and objects are in the front peripheral of the vehicle. A corner LIDAR sensor may be utilized to also detect and classify objects and used to enhance a vehicle's peripheral view of the vehicle's surrounding. A corner LIDAR sensor may be utilized to also detect and classify objects and used to enhance a vehicle's peripheral view of the vehicle's surrounding.

The forward radar sensor may be mounted in the front bumper of the vehicle. The corner radar sensor may be mounted in the corner of the bumper. Radar sensors may be configured to detect and classify objects to enhance a vehicle's peripheral view of the vehicle's surrounding. The radar sensors may be utilized to help or enhance various vehicle safety systems. The forward radar sensor may be built into a front bumper of the vehicle to determine that an object is ahead of the vehicle. The corner radar sensor may be located in the rear bumper or the side of the vehicle. The corner radar sensor may be utilized to determine if objects are in a driver's blind spot, as well as detecting vehicles or objects approaching from the rear on the left and right when reversing. Such functionality may allow a driver to navigate around other vehicles when changing lanes or reversing out of a parking space, as well as assist in autonomous emergency braking in order to avoid collisions that may be imminent.

The system 100 may also include a vehicle-to-vehicle or vehicle-to-infrastructure communication module (e.g. V2X module) 109. The V2X module 109 may be utilized to send and receive data from objects proximate to the vehicle. Such data may include data regarding the environment surrounding the vehicle or information about the object that the vehicle is communicating with utilizing the V2X module. In one scenario, the V2X module 109 might recognize a non-line-of-sight hazards which will influence the current driving session. The ECU 101 may determine the situation could become challenging soon for the driver to use an HMI presentation with a given level of complexity.

The system 100 may also include a global positioning system (GPS) 113 that detects or determines a current position of the vehicle. In some circumstances, the GPS 113 may be utilized to determine a speed that the vehicle is traveling. The system 100 may also include a vehicle speed sensor (not shown) that detects or determines a current speed that the vehicle is traveling. The system 100 may also include a compass or three-dimensional (3D) gyroscope that detects or determines a current direction of the vehicle. Map data may be stored in the memory. The GPS 113 may update the map data. The map data may include information that may be utilized with advanced driver assistance system (ADAS). Such ADAS map data information may include detailed lane information, slope information, road curvature data, lane marking-characteristics, etc. Such ADAS map information may be utilized in addition to traditional map data such as road names, road classification, speed limit information, etc. The controller 101 may utilize data from the GPS 113, as well data/information from the gyroscope, vehicle speed sensor, and map data, to determine whether a location or current position of the vehicle are suitable to use an HMI presentation with a given level of complexity.

The system 100 may also include a human-machine interface (HMI) display 115. The HMI display 115 may include any type of display within a vehicle cabin. Such HMI displays may include a dashboard display, navigation display, multimedia display, heads-up display, thin-film transistor liquid-crystal display (TFT LCD), etc. The HMI display 115 may also be connected to speakers to output sound related to commands or the user interface of the vehicle. The HMI display 115 may be utilized to output various commands or information to occupants (e.g. driver or passengers) within the vehicle. For example, in an automatic braking scenario, the HMI display 115 may display message that the vehicle is prepared to brake and provide feedback to the user regarding the same. The HMI display 115 may utilize any type of monitor or display utilized to display relevant information to the occupants. The HMI display 115 may also include a heads-up display ("HUD") that is utilized to display an interface and other objects on a windshield so that the images are within a driver's periphery while driving.

The center controller panel or a remote controller may be mounted interior of the vehicle to control various vehicle systems. For example, the center controller panel or a remote controller could control an air conditioner, a music player, a video player, and a GPS navigation. The driver status module processes data received from the center controller panel or a remote controller and monitors whether the driver is distracted by non-driving tasks and his/her level of engagement on secondary task. A center controller panel may include a touch screen interface, knobs, buttons and other types of interaction method. A remote controller may be located at the steering wheel, in front of arm rest or other locations that accessible to the user. A remote controller may include touch-pads, knobs, buttons and other types of interaction method. For example, when the center controller panel or a remote controller is being operated as the vehicle is traveling, the driver is involved in secondary tasks that are potentially distracting the driver. If the driver is distracted, the driver status module ECU may determine the abnormal situation.

In addition to providing visual indications, the HMI display 115 may also be configured to serve as the center controller panel, receiving user input via a touch-screen, user interface buttons, etc. The HMI display 115 may be configured to receive user commands indicative of various vehicle controls such as audio-visual controls, autonomous vehicle system controls, certain vehicle features, cabin temperature control, etc. The controller 101 may receive such user input and in turn command a relevant vehicle system of component to perform in accordance with the user input.

The controller 101 can receive information and data from the various vehicle components including the in-cabin monitor system 103, the DEMS 107, the GPS 113 and the HMI display 115. The controller 101 utilize such data to provide vehicle functions that may relate to driver assistance, or autonomous driving. For example, data collected by the in-cabin monitor system 103 and the DEMS 107 may be utilized in context with the GPS data and map data to provide or enhance functionality related to adaptive cruise control, automatic parking, parking assist, automatic emergency braking (AEB), etc. The controller 101 may be in communication with various systems of the vehicle (e.g. the engine, transmission, brakes, steering mechanism, display, sensors, user interface device, etc.). For example, the controller 101 can be configured to send signals to the brakes to slow the vehicle 100, or the steering mechanism to alter the path of vehicle, or the engine or transmission to accelerate or decelerate the vehicle. The controller 101 can be configured to receive input signals from the various vehicle sensors to send output signals to the display device, for example. The controller 101 may also be in communication with one or more databases, memory, the internet, or networks for accessing additional information (e.g. maps, road information, weather, vehicle information). The controller may also be utilized with the in-cabin monitor system 103 to identify facial features of an occupant of the vehicle, as explained in more detail below.

Figure 2:
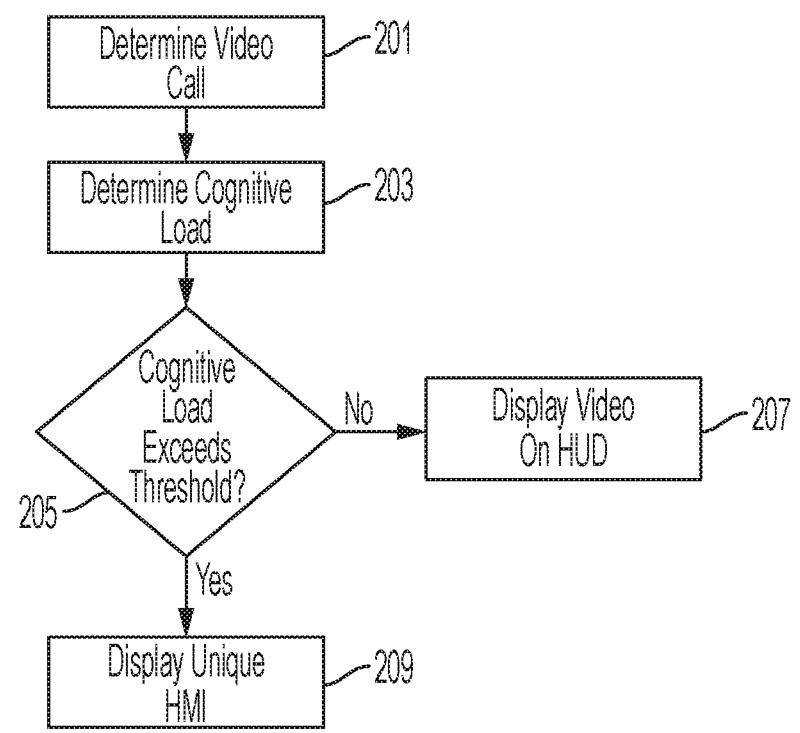
FIG. 2 is an exemplary flow chart 200 of a vehicle system identifying two different user interfaces utilized for video conferencing in response to a cognitive load of a user.

FIG. 2 is an exemplary flow chart 200 of a vehicle system identifying a unique 2-level presentation HMI (or multi-level HMI presentation) for video conferencing in response to a cognitive load of a user. The flow chart 200 may be implemented on a vehicle side application in a vehicle controller or off-board at a remote server. The system may first determine if a video call has occurred in the vehicle via a mobile phone utilizing a Bluetooth connection (or another connection) at step 201. The system may be flagged to identify a bit or data stream that identifies a video call as opposed to a typical phone/audio-only call. For example, a flag may be set in the Bluetooth protocol or any other communication stream that identifies a video-conference call is occurring. The system may utilize a different HMI for video calls than for an audio-only phone call. For example, the video call may require an image of video image be displayed on a display or heads-up display (HUD) of the vehicle. An audio-phone call, however, may not have an associated video image that is displayed with the call.

The system may also determine if a cognitive load of the user at step 203. The system may utilize various sensors in the vehicle to help identify a cognitive load of the vehicle. For example, the system may utilize a vehicle speed sensor to identify how fast the vehicle is traveling. At a high-level, the faster the vehicle is traveling, the cognitive load of the driver can be assumed to be greater (e.g. the driver is focusing on driving rather than the task). Thus, the higher the cognitive load, the more distracted the user may be with additional tasks that will prevent the user from being able to focus on additional information on an interface when a video conference session is taking place. The embodiments described above may also be applied to multi-level presentation HMI based on the user's cognitive workload. For example, the highest level of HMI could include all features of conference call. The rest of levels will only include reduced set of the conference call features.

One or more sensors in the vehicle may obtain data that is utilized to identify a cognitive load of an occupant of the car, e.g. cognitive-load data. For example, the cognitive load data may be data acquired from information obtained from various vehicle sensors (e.g. camera, radar, LiDar, in-vehicle camera, speed sensor, windshield wiper sensor, biometric sensor, etc.) as well as off-board servers. The vehicle may utilize other sensors, such as fog lights, windshield wipers, rain sensor may also be utilized as inputs to determining the cognitive load. When a fog light is activated, or the windshield wipers are moving faster, or a rain sensor identifies higher precipitation, the driver's cognitive load may be high.

Off-board data may be utilized to identify factors that may keep a user pre-occupied with driving and increase the cognitive load. For example, weather data from an off-board server can identify weather conditions. The weather data may identify sever weather updates, bad driving conditions (e.g. icy road), and other items that may affect a driver's cognitive load.

At another level, the cognitive load of the driver may be determined by an DSM (e.g. driver-facing camera) that monitors the occupant's behaviors, including facial movement, eye-movement, etc. The cognitive load of the driver may be determined by a DEMS 107 that monitors the surrounding vehicle environment, including the traffic conditions, proximity to other vehicles, complexity level of the road structure, and number of objects surrounding the vehicle etc. For example, if many vehicle or objects are surrounding the vehicle, the cognitive load of the driver may be higher. If the DEMS fails to identify objects or just a limited amount of objects, the cognitive load of the driver may be low.

Furthermore, information may be utilized to identify a driver of the vehicle to adjust a threshold for a cognitive load of the driver. For example, an age or driving experience of the user may factor into a driver's cognitive load threshold being lower. Identification of a driver may be determined by user profile data or information obtained from a mobile phone, camera (e.g. facial recognition), or vehicle settings.

The system may have a threshold cognitive load that is set to determine whether or not to display a video conferencing HMI screen with additional content and information as opposed to a more simplistic video conference HMI with less words, information, and content. For example, if a cognitive load of a driver is determined to be high, a more simplistic HMI may be shown. The system may utilize the cognitive load data to identify or estimate a cognitive load of the occupant of the vehicle. An example of A 2-level presentation HMI is described in more detail in FIG. 3A and FIG. 3B.

At step 205, the system may determine if the cognitive load of the occupant exceeds a threshold. The system may adjust the threshold based on various factors in the vehicle, such as an occupant of the car. The interface may also allow for automatic adjustment of the threshold that may be set by the user or via the interface. As such, the cognitive load data may be collected and analyzed to measure and compare against the threshold to determine how the vehicle system can process a video conference session based on a workload of a user. The system may have more than one threshold. Thus, if multiple thresholds are used, the system may utilize multiple interfaces that have varying level of content for each threshold. Thus, rather than having only two different interfaces, the system may have three, four, five, six, etc different interfaces that are adjusted by varying thresholds or levels.

At step 207, the vehicle system may output the video conferencing session on a HUD if the cognitive load is below a threshold amount. Thus, if a driver is determined to not be overworked (e.g. the vehicle is not in motion, clear path driving, autonomous/semi-autonomous driving system is helping out), a full-experience HMI of the video conference session may be presented. Thus, the screen may include video imagery of the other caller in the video conference session. Additionally, an in-vehicle camera or mobile-phone may display imagery of the occupant. An example of such an HMI when the cognitive load is high is shown in FIG. 3B.

At step 209, the vehicle system may output a different interface of the video conferencing session on a HUD if the cognitive load is below a threshold amount. Thus, if a driver is determined to not be overworked (e.g. the vehicle is not in motion, clear path driving, autonomous/semi-autonomous driving system is helping out), a full-experience HMI of the video conference session may be presented. Thus, video imagery may be shown for video conferencing HMI when the cognitive load is below a threshold amount. An example of such an HMI when the cognitive load is high is shown in FIG. 3A.

Figure 3A:
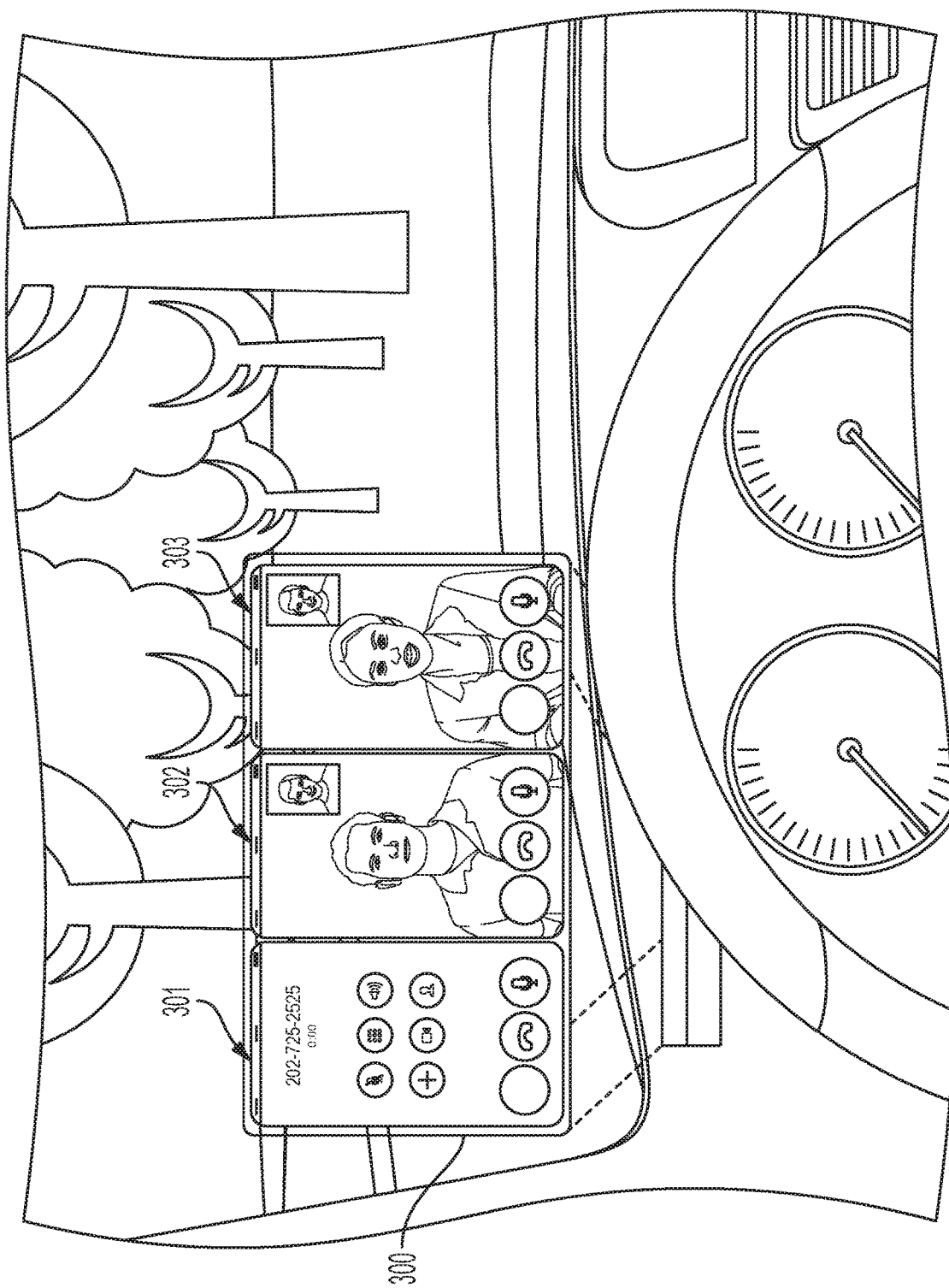
FIG. 3A is an example of a first user interface of a video conference session in response to a cognitive load of a user.

FIG. 3A is an example of a first user interface of a video conference session in response to a cognitive load of a user. FIG. 3A may be an example of an interface that displayed on a HUD 300 when a cognitive load of a user is below a threshold amount. As shown in FIG. 3A, the HUD 300 may display information regarding the video conference session. For example, the HUD 300 may show information regarding the caller or caller ID information in first window 301. The window may show caller identification information, a call duration, an option to mute, option to use a keyboard, volume controls, add participants, add contacts, or mute the video conference session. In window 302, the HUD 300 may display video regarding a first participant that is part of the video conference session. The video may also include an image of the occupant in the vehicle, for example, such as the image shown in the top right. In window 303, the HUD 300 may display video regarding a second participant that is part of the video conference session. The video may also include an image of the occupant in the vehicle, for example, such as the image shown in the top right. There might be additional windows to show a participation list, who is actively talking, shared documents, annotations, chat window and a controller interface, which allows conference controllers such as assigning presenter, recording, applying room restriction, selecting presentation materials etc.

Figure 3B:
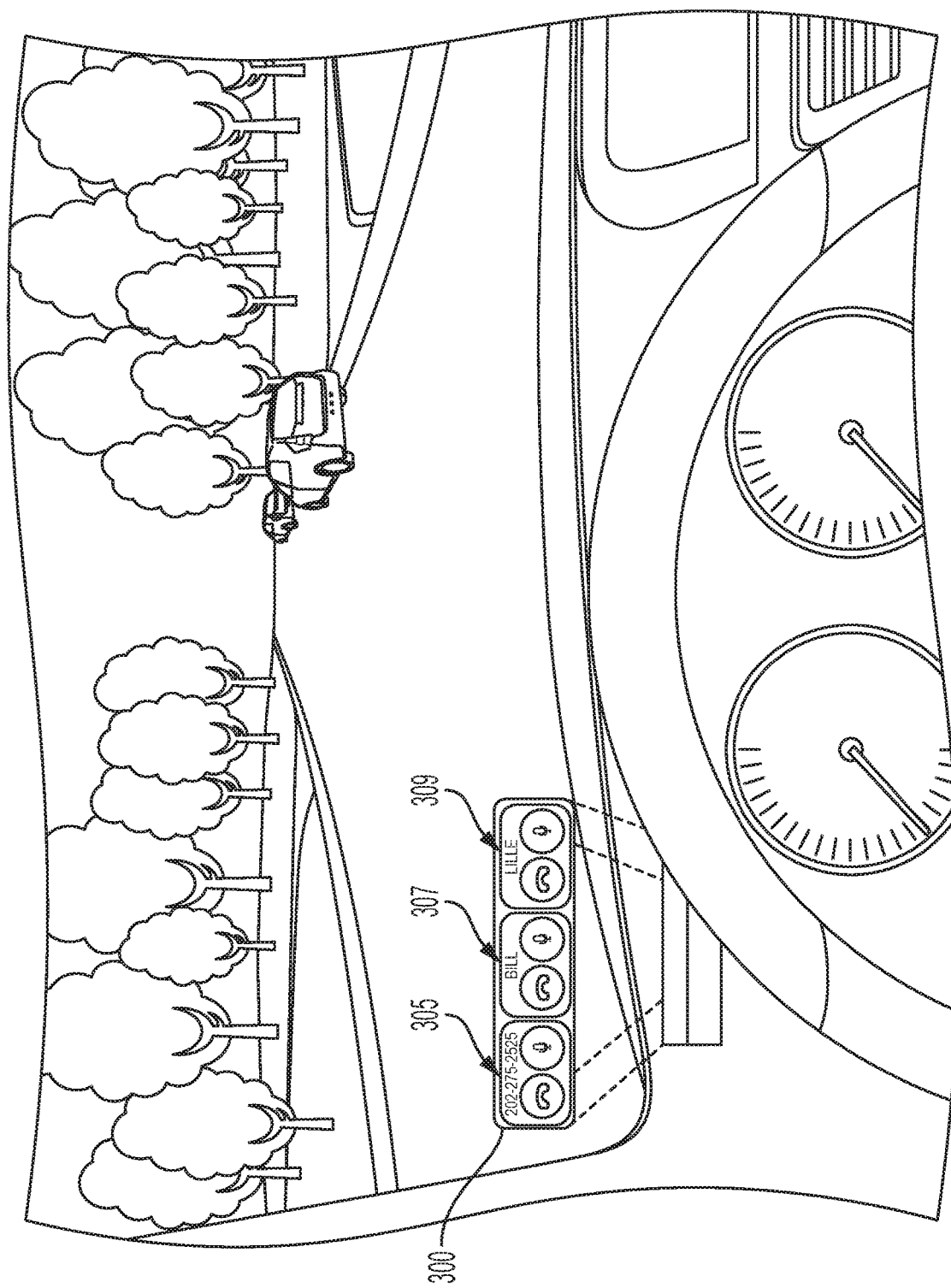
FIG. 3B is an example of a second user interface of a video conference session in response to a cognitive load of a user.

FIG. 3B is an example of a second user interface of a video conference session in response to a cognitive load of a user. FIG. 3B may be an example of an interface that displayed on a HUD 300 when a cognitive load of a user is above a threshold amount. Thus, the occupant or driver of the vehicle may be determined to be busy to focus on a video conference session. As shown in FIG. 3B, the HUD 300 may display information regarding the video conference session that is more simple and includes less information than the information displayed in HUD 300 when the cognitive load is below a threshold. For example, the HUD 300 may only show information regarding the caller ID information, an option to end the call, or a mute control in first window 305. In window 307, the HUD 300 may display information regarding a participant user that is part of the video conference session. However, the information regarding the user shown in window 307 may be less than the first user interface that is below a threshold amount. For example, window 307 may not have video displayed recording the users of the video conference session when the cognitive load exceeds a threshold amount. Another window 309 may be shown for another participant to display information regarding the video conference session. The video may also include an image of the occupant in the vehicle, for example, such as the image shown in the top right. Other conference related features may be reduced due to the elevated workload of the user. For example, the shared documents may not be displayed; or the user was blocked to assess the annotation functions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system in a vehicle, comprising:
   one or more sensors configured to obtain cognitive-load data indicating a cognitive load and cognitive demand of an occupant of the vehicle;
   a wireless transceiver in communication with a mobile phone;
   a controller in communication with the one or more sensors and the wireless transceiver, wherein the controller is configured to:
   determine an initiation of a video conference session on the mobile phone;
   determine a cognitive load of the occupant utilizing at least the cognitive-load data in response to the video conference session initiation; and
   output on a vehicle display a first user interface in connection with the video conference session when the cognitive load exceeds a threshold and a second user interface in connection with the video conference session when the cognitive load is below the threshold, wherein the first and second user interface are different.

2. The system of claim 1, wherein the first user interface includes less textual information than the second user interface.

3. The system of claim 1, wherein the first user interface excludes video images of the video conference session and the second user interface includes video images of the video conference session.

4. The system of claim 1, wherein the controller is further configured to obtain user profile information from the mobile phone via the wireless transceiver and adjust the threshold in response to the user profile information.

5. The system of claim 1, wherein the one or more sensors includes an in-vehicle camera that is configured to monitor movement of the occupant and utilize information associated with the movement of the occupant to determine the cognitive load.

6. The system of claim 1, wherein the controller is further configured to obtain user profile information from a key-fob associated with an occupant of the vehicle and adjust the threshold in response to the user profile information.

7. The system of claim 1, wherein the system further includes a camera configured to capture images of the occupant of a vehicle; and
   utilize the images of the occupant in the video conference session.

8. The system of claim 7, wherein the images of the occupant in the video conference session are shown in the second user interface.

9. The system of claim 1, wherein the first user interface does not include video imagery from the video conference session and the second user interface includes video imagery from the video conference session.

10. A system in a vehicle, comprising:
   one or more sensors configured to obtain cognitive-load data indicating a cognitive load and cognitive demand of an occupant of the vehicle;
   a controller in communication with the one or more sensors, wherein the controller is configured to:
      determine a cognitive load of the occupant utilizing at least the cognitive-load data in response to an initiation of a video conference session; and
      output on a vehicle display a first user interface in connection with the video conference session when the cognitive load exceeds a threshold and a second user interface in connection with the video conference session when the cognitive load is below a threshold, wherein the second user interface includes video of the video conference session and the first user interface excludes video of the video conference session.

11. The system of claim 10, wherein the controller is further configured to obtain user profile information from a key-fob associated with an occupant of the vehicle and adjust the threshold in response to the user profile information.

12. The system of claim 10, wherein the first user interface includes less textual information than the second user interface.

13. The system of claim 10, wherein the controller is further configured to obtain user profile information from a mobile phone via a wireless transceiver in communication with the controller and adjust the threshold in response to the user profile information.

14. The system of claim 10, wherein the one or more sensors includes an in-vehicle camera that is configured to monitor movement of the occupant and utilize information associated with the movement of the occupant to determine the cognitive load.

* * * * *